Feb. 19, 1924.  
S. B. SHAW  
VEHICLE SIGNAL  
Filed Oct. 3, 1921  
1,484,089  
3 Sheets-Sheet 3

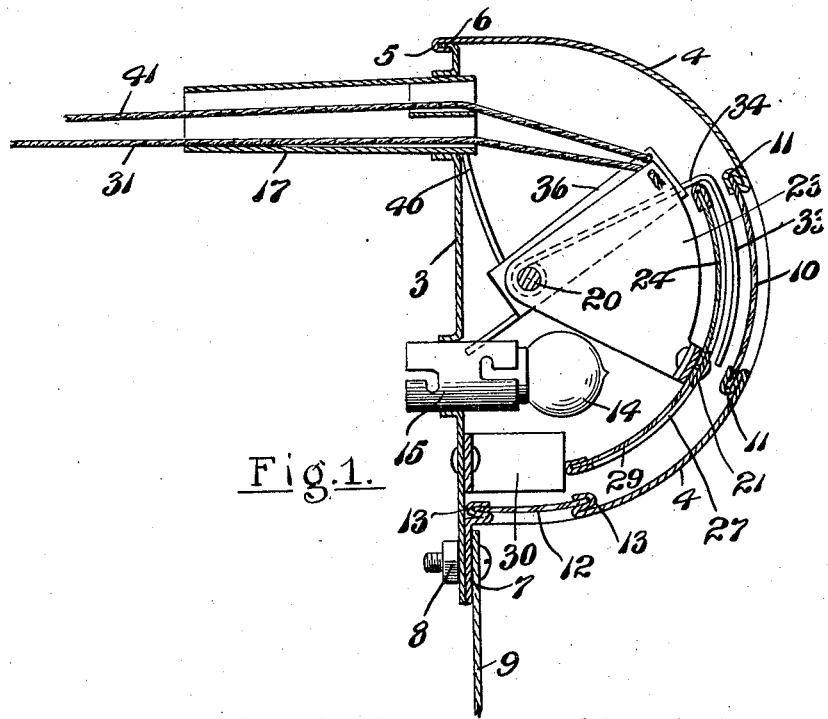
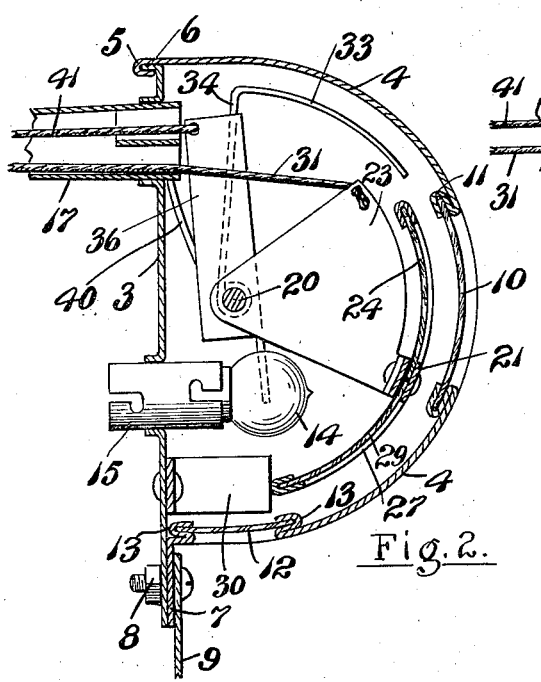
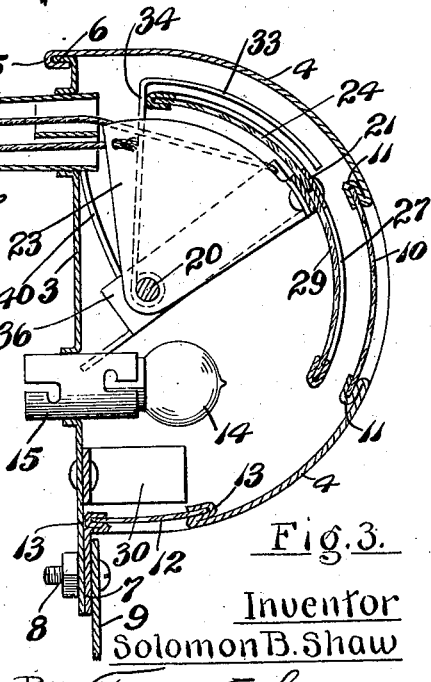

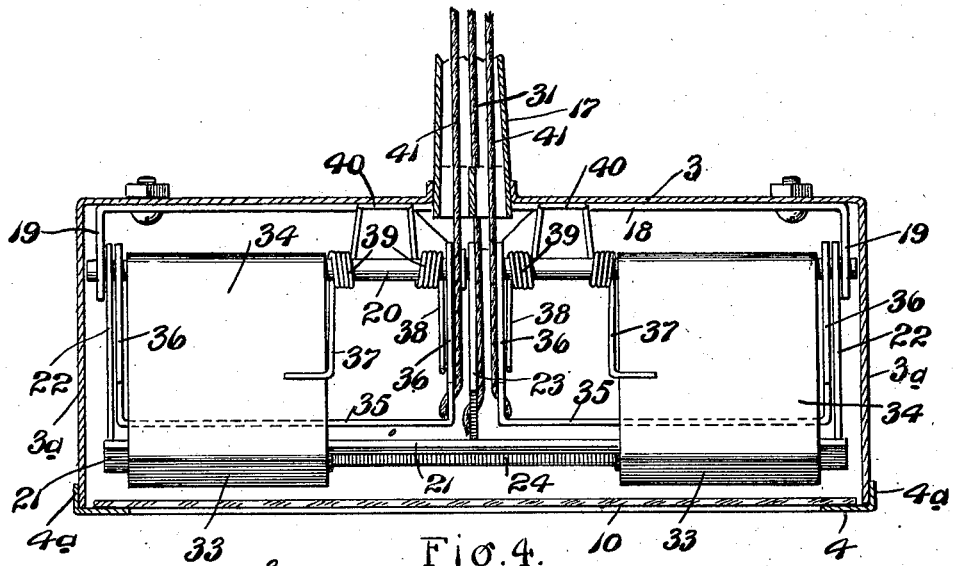
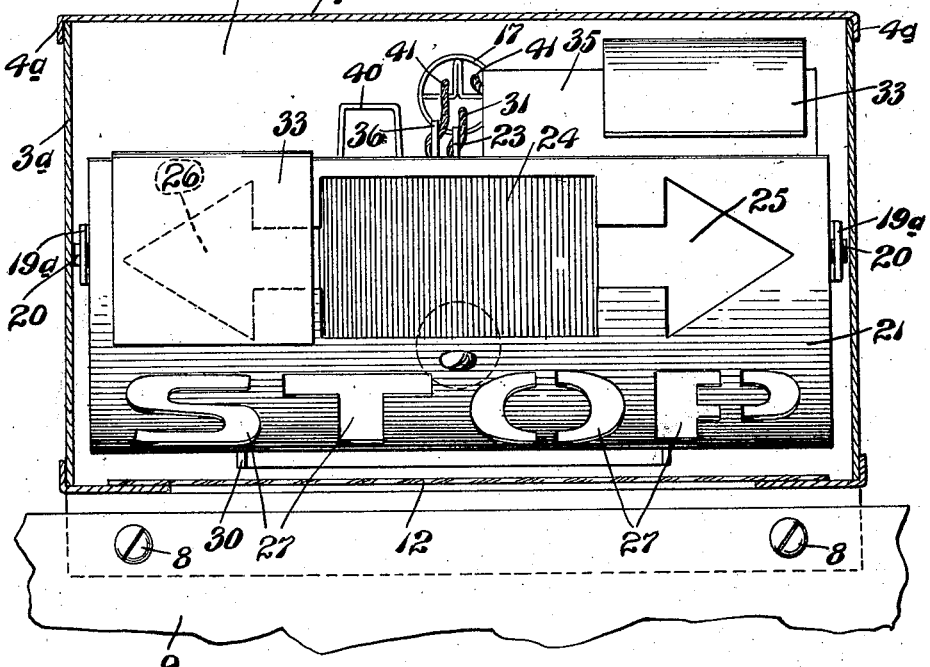

Inventor  
Solomon B. Shaw  
By Frank E. Liverance, Jr.  
Attorney.

Patented Feb. 19, 1924.

1,484,089

UNITED STATES PATENT OFFICE.

SOLOMON B. SHAW, OF LOS ANGELES, CALIFORNIA.

VEHICLE SIGNAL.

Application filed October 3, 1921. Serial No. 505,032.

*To all whom it may concern:*

Be it known that I, SOLOMON B. SHAW, a citizen of the United States of America, residing at Los Angeles, in the county of Los Angeles and State of California, have invented certain new and useful Improvements in Vehicle Signals; and I do hereby declare the following to be a full, clear, and exact description of the invention, such as will enable others skilled in the art to which it appertains to make and use the same.

This invention relates to signals for motor vehicles, being particularly concerned with direction signal indicator means which may be shown at the will of the driver of the vehicle to indicate to vehicles following behind the proposed change of direction to be made, combined also with a means for indicating to said following vehicles a warning when the vehicle equipped with the signal is to stop or slow down. The present invention is primarily concerned with the construction of a very simple and economically manufactured signal of this character and one which is an improvement over the construction shown in my Patent No. 1,313,609, issued Aug. 19, 1919, adding thereto a means for showing change of direction indications operable at the will of the driver of the vehicle.

For an understanding of the invention, and the constructions embodying the same, reference may be had to the following description, taken in connection with the accompanying drawings, in which, Fig. 1 is a vertical transverse section taken centrally through the signal, with all of the parts thereof in lower inoperative position.

Fig. 2 is a like section but with one of the covering members drawn to upper position to indicate a change in direction.

Fig. 3 is a like section, all of the parts being drawn to upper position to indicate the "Stop" signal.

Fig. 4 is a plan view of the interior mechanism of the signal, the enclosing case therefor being in horizontal section.

Fig. 5 is a rear elevation of the interior mechanism of the signal, in the position shown in Fig. 2, the case being in longitudinal vertical section.

Like reference characters refer to like parts in the different figures of the drawings.

Figure 6:
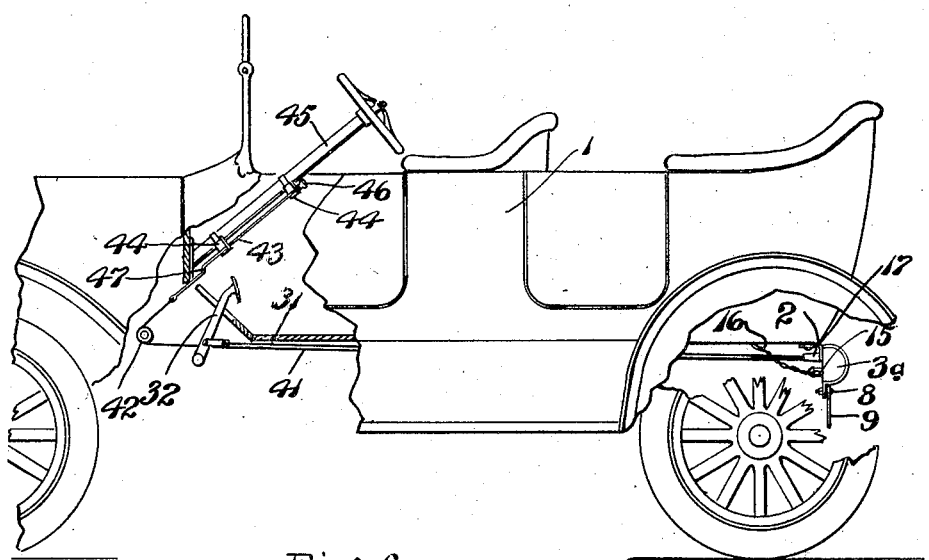
Fig. 6 is an elevation of a motor vehicle equipped with my invention, parts of the vehicle being broken away and in section to show the installation.
Figure 7:
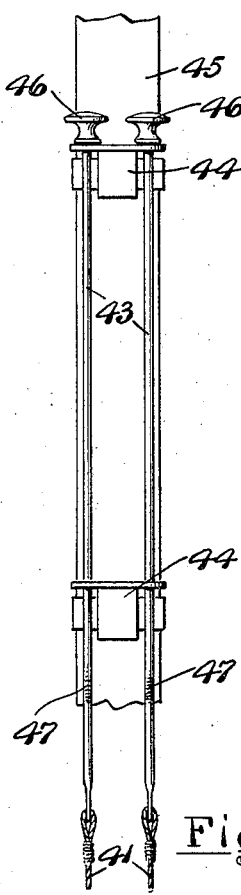
Fig. 7 is a rear elevation of the steering post of the motor vehicle with the direction indicating operating members mounted thereon.

The signal is adapted to be attached to the body 1 of a motor vehicle at the rear end thereof, any suitable connecting device, such as a bracket 2 being used, as shown in Fig. 1. The signal, in its construction, includes an enclosing case, having a front vertical side 3 of rectangular outline from each end of which substantially semi-circular ends 3ª are turned at right angles to the rear. The case is completed by a substantially semi-cylindrical back 4 of sheet metal, hooked at 5 at its upper edge over a forwardly extending flange 6 at the upper edge of the side 3, and at its lower edge being formed with a downturned flange 7 which lies against the lower portion of the side 3 and to which it is attached by bolts 8, the same also being utilized for the attachment of the usual license number plate 9 required on motor vehicles. An elongated horizontally located opening is made in the rear side of the back 4 and is filled with a transparent member 10 seated at its edges in retaining guides 11 made from the metal of the case back 4 at the upper and lower edges of the opening. A second elongated opening is made at the lower side of the back member 4 and filled with a transparent member 12 held at its edges in like guides 13. An electric bulb 14 is positioned over the transparency 12, being carried at the inner end of a socket member 15 passed through the vertical side 3 of the case, circuit wires 16 for the bulb leading forward from the front end of the socket to any suitable battery or other source of electrical energy. A sleeve 17 is secured to and extends forward from the side 3 near its upper portion, to serve as a guide for the operating cables, as later described.

A bar 19 of flat metal is disposed horizontally against the rear side of the front 3 of the case, at its ends having ears 19ª turned to the rear which serve as a support for a rod 20 mounted on and between said ears. The rod 20 coincides substantially with the longitudinal central axis of curvature of the back 4 of the case. A curved signal member 21 of sheet metal substantially concentric with the back 4 of the case is rotatably mounted on the rod 20, ends 22 and an intermediate member 23 being mounted on the rod and extending outwardly to said signal member and connecting thereto, as shown. The signal member has a rectangular opening substantially midway between its ends in which a section 24 of red glass is secured, at each end of which arrow-shaped openings 25 and 26 are cut through the member 21 and backed by transparent material or other material showing white to one following from the rear when exposed to view. The arrows 25 and 26 extend in opposite directions from the central red glass 24. Below the upper portion of the signal member 21 at which the arrows and red glass are located, a series of openings in the form of letters, indicated at 27 are cut lengthwise of the member, forming the word "Stop", and a transparent or white translucent member 29 covers these letter openings and is disposed between the same and the light bulb 14.

This signal member 21 is designed to normally occupy a lower position in the case with its lower edge bearing against a stop bracket 30 attached to side 3, such position being shown in Fig. 1. In such position, the red glass and arrow openings are directly in alinement with the transparent member 10 carried by the case, and with the light at 14 lighted, makes a tail light for the vehicle. As the arrows are normally covered, as will be hereafter described, only the red will show in the normal running operation of the vehicle. A cable 31 is attached to the intermediate member 23, passing forward through sleeve 17 and having connection to the service brake pedal 32 of the vehicle. Whenever the brake pedal is operated as in slowing the vehicle or bringing it to a stop, a pull is exerted on the cable, thereby lifting the signal member into position such that the Stop characters show through the transparency at 10, and warn following vehicles relative to the probable slowing or stopping movement of the vehicle equipped with the signal.

The arrows at 25 and 26 are normally covered so that the same do not show from behind. Sheet metal covering members 33, curved to pass over the arrow portions of the signal member 21 are used one for each arrow, and each has an integral forwardly bent portion 34 which extends to and is bent around the rod 20 so as to turn thereon. A bar 35 is located under each part 34, at its ends being bent at right angles as indicated at 36, the inner ends of the parts 36 having the rod 20 passing therethrough. A spring is associated with each covering member, the same being of wire with one end 37 bearing against the upper side of the part 34, the other end 38 being free, coils 39 passing around the rod 20, and the middle portion 40 of the spring bearing against the side 3 of the case. The springs, under tension, serve normally to force the covering members downwardly against the signal member 21, and force the signal member against the stop brackets 30, as is evident.

A cable 41 is connected to each of the inner parts 36, both cables leading forward through the guide sleeve 17 to and around pulleys 42 mounted on the vehicle below and in front of the lower end of the steering post of the vehicle. The cables are attached to the lower ends of rods 43 which are slidably mounted on suitable brackets 44 fixed at spaced apart intervals on the steering post 45, each rod at its upper end being equipped with an operating knob 46. Each rod a short distance below the lower bracket 44 has a reverse bend therein, functioning as a stop against upward movement of a rod when it strikes against the lower bracket 44.

Figure 8:
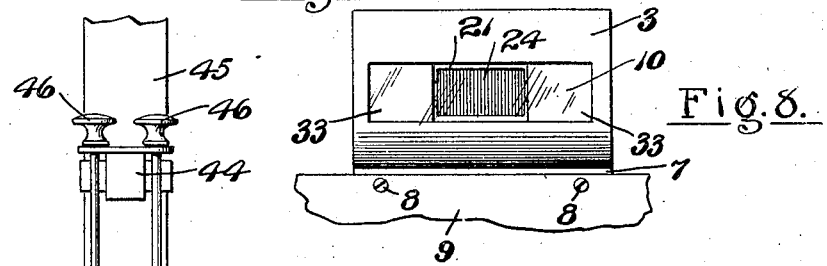
Figs. 8, 9 and 10 are rear elevations of the signal in three different positions of its use.
Figure 9:
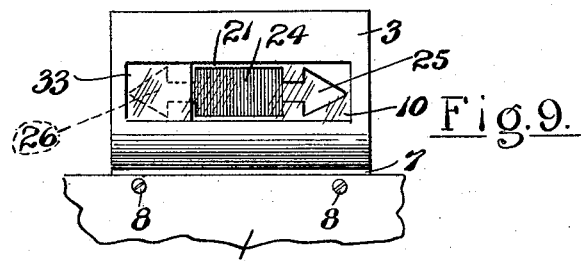
Figure 10:
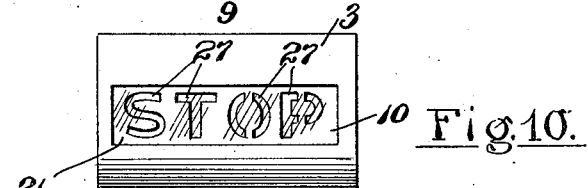

Normally, the springs cause the different signal and cover members to occupy lower position, as shown in Figs. 1 and 8, both arrows being covered, the red glass 24 showing, while at night, the light passes through glass 12 to shine on the license plate. As such, a tail light is provided. If a turn is to be made to the right, the knob 46 of the right hand rod 43 is grasped and the cover member 33 covering the right arrow 25 is raised, as shown in Figs. 2 and 9, the arrow appearing to one behind to indicate the proposed direction of turning. The same operation is gone through with for the left hand turn, merely the other operating rod 43 being pulled upward. When the car is stopped or slowed in speed by operating the service brake pedal, the signal member 21 is elevated together with both cover members which lie against its upper edge, as shown in Figs. 3 and 10, the signal Stop appearing automatically with the operation of the brake pedal. On release of the pedal or of either of the rods 43, springs actuating the arrow covering members cause the whole mechanism within the case to go back to original position as shown in Figs. 1 and 8, when the device again becomes a tail light only.

The construction is very simple and economical to manufacture and is particularly effective and simple in operation. Its installation is easy. In every way the device is a practical and operative construction which has proved its merit in practice. The appended claims define the invention and I consider the invention to cover all forms of structure coming within their scope.

I claim:

1. A signal, comprising an enclosing casing having an opening in its rear side, a signal member mounted to turn on a horizontal axis within the casing, said signal member having an opening filled with a red glass near its upper edge and two arrow-shaped extensions, one at each end of the first opening therein, and at its lower portion having stop signal characters cut therethrough, a covering member pivotally mounted to pass one over each arrow-shaped extension, spring means for holding the signal member and said covering members in a lower position, individual means for elevating either covering member, and means for elevating the signal member and both covering members simultaneously, substantially as described.

2. A signal, comprising an enclosing casing having an opening in its rear side, a signal member movably mounted within the casing and having two oppositely extending arrow-shaped openings therein normally positioned directly in front of the opening in the casing, two covering members movably mounted within the casing and normally covering said arrow-shaped openings, means normally holding the signal member and covering members in one position, and means for individually moving either covering member to uncover said arrow-shaped opening in the signal member and for moving the signal member and both covering members to an upper position, substantially as described.

3. A signal, comprising an enclosing casing having an opening in one side, a signal member movably mounted to pass by said opening, said signal member having two opposite direction indications thereon and a stop indication thereon, means normally holding the signal member in a lower position wherein the direction indications are directly in front of the opening in the casing, two covering members normally covering the two direction indications, individual means for lifting either covering member to disclose the direction indication thereunder, and means for moving the signal member and both covering members together to disclose the stop indication, substantially as described.

4. In combination, a casing having a curved rear side with an opening therein, a rod located horizontally lengthwise of and within the casing, a curved signal member mounted for turning movement on the rod, said signal member being located substantially concentric with and in front of the rear side of the casing and having two oppositely positioned direction indications thereon and a stop indication below the direction indications, two covering members pivotally mounted on the rod and normally covering the direction indications on the signal member, spring means acting on the signal and covering members to hold them in lower position, a cable attached to each covering member for individually lifting either one at will, and a cable attached to the signal member for turning the same with the covering members to an upper position to disclose the stop indication on the lower portion of the signal member, substantially as described.

5. In combination, the elements in combination defined in claim 4, combined with manually operable means attached to each of the cables connected with the covering members for manually pulling on the cables to lift the covering members.

6. In a signal, a movably mounted signal member formed of sheet metal and provided at its upper portion with a central opening from which at each end oppositely extending arrow-shaped openings project, and at its lower portion with open letters cut therethrough forming the word Stop, a red glass in the central opening, a casing enclosing the signal member having a rear side with an opening directly back of the upper openings in the signal member, spring means normally holding the signal member in lower position with the word Stop below the opening in the rear side of the casing, a covering member movably mounted within the casing and normally disposed one between each end portion of the signal member and the rear side of the casing to cover the arrow-shaped openings, means for lifting either covering member, and means for lifting the signal member and both covering members in unison to bring the word Stop into view through the opening in the rear side of the casing, substantially as described.

In testimony whereof I affix my signature.

SOLOMON B. SHAW.